Patented Mar. 23, 1948

2,438,209

UNITED STATES PATENT OFFICE 2,438,209

REACTION PRODUCT OF GRAMICIDIN AND FORMALDEHYDE AND METHOD OF PRODUCTION

Heinz L. Fraenkel-Conrat, Harry Humfeld, and James C. Lewis, Berkeley, Keene P. Dimick, Lafayette, and Harold S. Olcott, Berkeley, Calif., assignors to the United States of America as represented by the Secretary of Agriculture No Drawing. Application September 25, 1945, Serial No. 618,605

4 Claims. (Cl. 260—236.5)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to us of any royalty thereon.

The object of this invention is to provide a method for obtaining a substance of improved pharmacological properties from gramicidin.

Gramicidin is a crystalline antibiotic substance of known composition that can be obtained from cultures of certain strains of Bacillus brevis. Investigators have studied its means of production, separation, crystallization, and biological properties. Hotchkiss, Advances in Enzymology, vol. 4, Academic Press, New York; Herrell, Penicillin and Other Antibiotic Agents, W. B. Saunders Co., Philadelphia, 1945; Waksman, Microbial Antagonisms and Antibiotic Substances, Commonwealth Fund, New York, 1945.

Although gramicidin is an effective antibiotic substance in very low concentrations, its usefulness internally in the animal organism is limited because of its toxicity. Intravenous or intraperitoneal administration causes death at levels ranging from 10 to 30 mg. per kg. Since gramicidin is known to cause a slow hemolysis of red blood cells in vitro and in vivo, it is assumed that this hemolytic activity is largely responsible for the toxicity, although such a direct relationship has not been proven.

By reacting gramicidin with formaldehyde, we have discovered that the reaction product, hereafter called "gramicidin-formaldehyde," has markedly decreased hemolytic and toxic properties. In addition, it is somewhat more soluble in water, which is of advantage in that the substance can more readily come into contact with microorganisms. The decrease in toxicity and the increased solubility in water make the gramicidin-formaldehyde of considerably greater potential usefulness in medicine than gramicidin itself.

Material of substantially the same properties can be obtained from crystalline gramicidin, from crude gramicidin as obtained by an extraction of tyrothricin with a mixture of acetone and ether, or from gramicidin prepared by the phosphotungstate method of separation covered in a copending application, Serial No. 617,913, filed September 21, 1945. It will be understood that the reaction of gramicidin with formaldehyde can be achieved with preparations obtained as described above or by any other means of separation from the other constituents of tyrothricin, and that crude preparations can be as effectively treated as the purified material.

The following example will illustrate the method of treatment of gramicidin with formaldehyde:

Example

One gram of gramicidin was dissolved in 20 ml. of 95% ethanol, and to it was added 2 ml. of 4% aqueous sodium hydroxide solution and 10 ml. of 40% formaldehyde (commercial Formalin). The mixture was held at 53° C. for 2 days, then diluted with 150 ml. of water. The milky suspension of gramicidin-formaldehyde was precipitated by the addition of 15 ml. of 5% sodium chloride and centrifuged. The precipitate was then washed 3 times by resuspension in water and precipitation with decreasing amounts of sodium chloride solution, and finally dried by evaporation from the frozen state. The product was a white powder readily soluble in methanol, ethanol, and acetone. Like gramicidin, it tends to form colloidal suspensions in distilled water. When assayed as an antibiotic agent by an in vitro test, the gramicidin-formaldehyde was found to be approximately as effective as unmodified gramicidin in inhibiting the growth of Staphylococcus aureus. In order to test gramicidin-formaldehyde for toxicity, samples were dissolved in 20% ethyl alcohol, 80% propylene glycol mixture and injected intraperitoneally into rats. Whereas similarly dissolved doses of gramicidin of the amount of 30 to 150 mg./kg. were fatal to rats, doses of gramicidin-formaldehyde of the amount of 250 to 750 mg./kg. did not cause death.

The mode of treatment of gramicidin with formaldehyde can be varied considerably and yet the product appears to have substantially the same properties as measured by biological methods. For example, the amount of alkali used can be varied so that the mixture may have a pH anywhere within the range of 6 to 12. The reaction does not appear to occur as readily in the acid pH range. The concentration of formaldehyde can be varied from 2 to 20 ml. of 40% formaldehyde. The temperature and time of incubation are not critical. Reaction occurs at room temperature more slowly, and at temperatures as high as 100° C. more rapidly. After the end of the reaction period, the product may be isolated at any of the known procedures. Any one of a number of inorganic salts may be used to coagulate the milky suspension which appears after dilution of the reaction mixture with water. We have chosen to use sodium chloride only because its presence in trace amounts in the final product would not be detrimental to medical use. The final product can be dried in a current of air or in a vacuum desiccator as well as from the frozen state.

Although we do not know the exact nature of the mode of combination of formaldehyde with gramicidin, there is evidence that combination occurs with the indole groups of the tryptophane residues. Gramicidin contains 33–40% of tryptophane. The presence of the indole side chains of tryptophane can be determined colorimetrically in unhydrolyzed gramicidin, but not in gramicidin-formaldehyde. When gramicidin is hydrolyzed by boiling with hydrochloric acid-acetic acid mixtures, the hydrolysate is a clear colorless liquid in which the expected amount of tryptophane can readily be determined by known methods. However, when gramicidin-formaldehyde is hydrolyzed under the same conditions, a black insoluble material forms and the solution does not give the typical colors of the tryptophane reaction. The product of the reaction between N-acetyl tryptophane and formaldehyde also gives a black insoluble material when subjected to the conditions of acid hydrolysis.

Having thus described our invention, we claim:

1. The method of preparing a compound having high antibiotic and low hemolytic and toxic properties comprising subjecting gramicidin to reaction with formaldehyde in a neutral to alkaline medium.

2. The method of preparing a compound having high antibiotic and low hemolytic and toxic properties comprising subjecting preparations containing gramicidin as the main antibiotic agent to reaction with formaldehyde in a neutral to alkaline medium.

3. The method of preparing a new medicinal compound having high antibiotic and low hemolytic and toxic properties comprising dissolving granicidin in ethanol, adjusting the pH to an alkaline reaction thence adding formalin, permitting the reaction between the gramicidin and the formaldehyde to proceed to substantial equilibrium, diluting the resulting mixture with water and adding a salt to precipitate the gramicidin-formaldehyde, thence separating the precipitate and washing and drying it.

4. A composition of matter comprising the reaction product of gramicidin and formaldehyde.

HEINZ L. FRAENKEL-CONRAT.
HARRY HUMFELD.
JAMES C. LEWIS.
KEENE P. DIMICK.
HAROLD S. OLCOTT.

REFERENCES CITED

The following references are of record in the file of this patent:

Hotchkiss et al.: J. Bio. Chem., vol. 141, pp. 155–162 (1941).